United States Patent [19]
Bonnebat et al.

[11] Patent Number: 6,120,833
[45] Date of Patent: Sep. 19, 2000

[54] METHOD AND DEVICE FOR MEASURING THE THICKNESS OF AN INSULATING COATING

[75] Inventors: Claude Bonnebat, Pontault Combault; Samy Branci, Chanac, both of France

[73] Assignee: Sollac, Puteaux, France

[21] Appl. No.: 09/147,679

[22] PCT Filed: Aug. 6, 1997

[86] PCT No.: PCT/FR97/01457

§ 371 Date: Mar. 17, 1999

§ 102(e) Date: Mar. 17, 1999

[87] PCT Pub. No.: WO98/06999

PCT Pub. Date: Feb. 19, 1998

[30] Foreign Application Priority Data

Aug. 12, 1996 [FR] France ................................... 96 10104

[51] Int. Cl.[7] ........................................................ B05D 3/14
[52] U.S. Cl. ............................... 427/10; 427/9; 118/712
[58] Field of Search ........................... 427/9, 10; 118/712

[56] References Cited

U.S. PATENT DOCUMENTS

| | | | |
|---|---|---|---|
| 5,355,083 | 10/1994 | George et al. | 324/229 |
| 5,891,509 | 4/1999 | Kawana et al. | 427/10 |

FOREIGN PATENT DOCUMENTS

| | | |
|---|---|---|
| 0 629 450 | 12/1994 | European Pat. Off. . |
| 2 707 109 | 1/1995 | France . |
| 40 07 363 | 9/1991 | Germany . |
| 60-115804 | 6/1985 | Japan . |
| 6-300509 | 10/1994 | Japan . |

OTHER PUBLICATIONS

Patent Abstracts of Japan, vol. 009, No. 269 (P–400), Oct. 26, 1985, JP 60 115804, Jun. 22, 1985.

Patent Abstracts of Japan, vol. 095,No. 001, Feb. 28, 1995, JP 06 300509, Oct. 28, 1994.

*Primary Examiner*—Katherine A. Bareford
*Attorney, Agent, or Firm*—Oblon, Spivak, McClelland, Maier & Neustadt, P.C.

[57] ABSTRACT

During the application of a roll coating on a metal substrate, using double contactless measuring sensors (1, 3), inductive, and for instance optical or capacitive, the method consists in effecting, before application, at least a double distance measurement over a strip zone not yet coated, then, effecting, after application, at least another double distance measurement over approximately the same zone already coated, and the thickness of the applied coating is deduced from the double measurements before application and after application. The invention is applicable to the measurement of thickness, on ferromagnetic substrates, of non solidified coatings, in particular liquid or pasty and to the adjustment of thickness in installations with corresponding coatings.

22 Claims, 5 Drawing Sheets

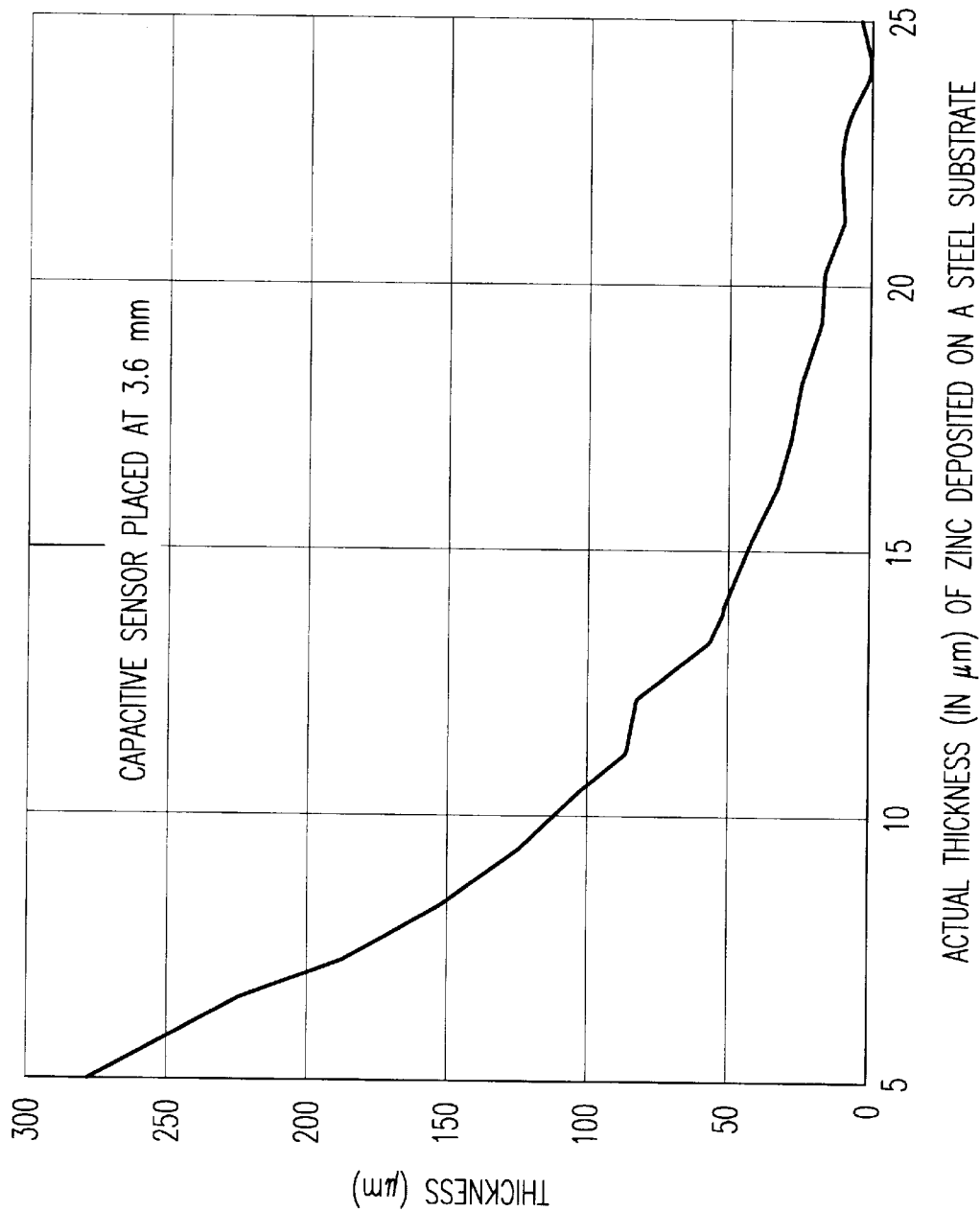

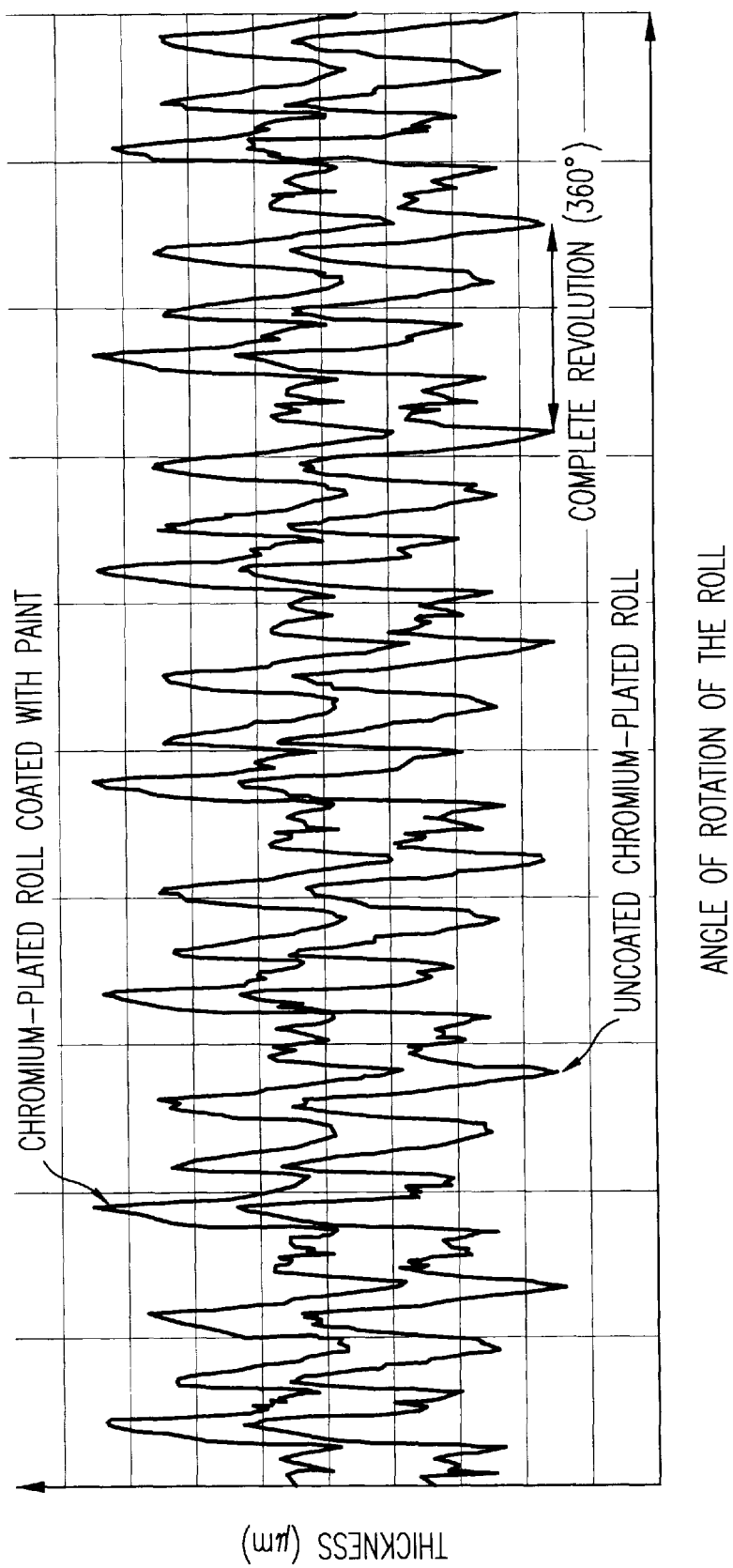

METHOD AND DEVICE FOR MEASURING THE THICKNESS OF AN INSULATING COATING

This case is a national stage application of PCT/FR97/01457, filed Aug. 6, 1997.

BACKGROUND OF THE INVENTION

1. Field of the Invention

The invention relates to a method and to a device for continuously measuring the thickness of an insulating coating applied to a moving ferromagnetic substrate, such as a metal strip or roll.

2. Discussion of the Background

The travelling metal strip to be coated is especially a steel strip, which is bare or coated with a paramagnetic metal layer, such as a layer of zinc, tin, aluminium or alloys based on these metals, or else already coated with an insulating layer, such as a paint.

The thickness of the paramagnetic metal layer is generally between 1 and 100 μm.

The rotating metal roll to be coated is, for example, a so-called "transfer" roll for transferring the coating onto any strip travelling over the said roll; the metal roll is, for example, a steel roll, bare or coated with a metal layer, such as a chromium layer; the insulating coating is applied to the roll and then transferred onto the strip (these methods are called forward roll coating or reverse roll coating).

The insulating coating to be applied is, for example, a paint or a polymer.

The insulating coating may be applied in the liquid state, for example by coating with a solution (especially in the case of a paint) or by extrusion (especially in the case of a polymer).

The insulating coating may also be applied in the solid state, for example by powder spraying or by pressing a polymer film onto the substrate.

A plant for continuously coating a strip generally comprises means for applying the coating to the strip, means for making the strip travel continuously from the upstream end to the downstream end of the plant and means for adjusting and/or regulating the thickness applied.

In the case of intermediate application to a transfer roll, the thickness applied to the transfer roll may be adjusted or regulated.

In the case of the application of paints, a coating head is normally used as application means and the plant then also includes means for drying the paint, these being placed downstream of the application means.

The drying means are regarded as means for solidifying the coating.

Thus, in the case of the application of paint to a metal strip, the strip passes through the paint application means, emerging therefrom coated with a layer of wet paint, and then passes through means for drying the applied coating, emerging therefrom coated with a layer of dry paint.

As non-contacting means for measuring the thickness of an insulating coating applied to a conducting substrate, devices which combine two types of sensor, the first sensor for measuring the distance from the device to the interface between the conducting substrate and the insulating coating and the second for measuring the distance from the device to the coated surface facing it, are known.

The thickness of the coating is then deduced from the difference between the datum given by the first sensor and the datum given by the second sensor.

This method and this device are, for example, described in French Patent Application No. 2,707,109, in European Patent Application No. 0,629,450 and in German Patent Application DE 4,007,363.

As an example of the second sensor, an optical distance measurement sensor may be used, for example one which operates by triangulation of beams, such as the one described, for example, in U.S. Pat. No. 5,355,083.

As an example of the second sensor, a capacitive sensor may also be used because the applied coating is insulating and because the substrate is conducting; the capacitive sensor must be calibrated depending on the dielectric constant of the coating at the measurement frequency used; specifically, it must generally be positioned a short distance from the coated substrate (about a few millimeters in order to have an accuracy of about 1 micrometer).

The operation of the capacitive-type sensors is based on the measurement of a capacitance formed between a plane electrode of the sensor and the metal substrate; this capacitance is formed from the layer of air separating the sensor from the coated substrate and of the insulating coating itself; this capacitance is measured by supplying an AC electric current; these known sensors are designed to deduce the distance separating the sensor from the surface of the coated substrate from this capacitance measurement or "capacitive signal".

As an example of the first sensor, an inductive sensor may be used.

The operation of inductive-type sensors is based on measuring, at some distance from the substrate, the magnetic induction and/or the eddy currents generated in the substrate by a solenoid in the sensor which is supplied with an AC electric current; these known sensors are designed to deduce the distance separating the sensor (or a reference plane associated with the sensor) from the substrate/insulating coating interface from this measurement or "inductive signal".

The response of an inductive sensor is not linear and it is important to calibrate it before it is used; for the calibration, the procedure as indicated in the already mentioned document FR 2,707,109 may be used;

an uncoated conducting substrate is introduced into the field of the device combining two sensors, the device is moved transversely to the substrate, for each movement, the sensor/substrate distance is measured using the second sensor (for example an optical or capacitive sensor) and the inductive signal, and the desired calibration function, namely distance=f (inductive signal), is thus established.

The response of the inductive sensor is thus "linearized" in such a way that the datum given by the sensor is a distance value.

In order to measure, without any contact, the thickness of an insulating coating on a conducting substrate, the inductive measurement method proves, however, to be unusable in very many practical cases, especially when an accuracy of about ten micrometers, or even one micrometer, is required, especially when the metal substrate is ferromagnetic and/or has a surface which is heterogeneous, something which is the case, for example, with galvanized or tin-plated steel strip or with chromium-plated steel rolls.

This is because, when the metal substrate is ferromagnetic and/or has a surface which is heterogeneous, the Applicant has observed that the large fluctuations in the electrical conductivity and in the magnetic susceptibility over the depth near the metal surface in the zone of penetration of the radiation emitted by the inductive sensor caused considerable perturbations in the "inductive signal".

The depth of the zone of penetration of the radiation emitted by the sensor depends on the frequency—this is the well-known "skin effect" phenomenon.

The standard skin depth δ (in mm) is calculated as being the depth in the substrate at which the intensity of the eddy currents has dropped by 37% with respect to the value at the surface; it is expressed in the following manner:

$$\delta = 50\sqrt{\frac{\rho}{\mu_r \times f}},$$

where ρ is the resistivity of the substrate ($\mu\Omega\cdot$cm), f is the measurement frequency (Hz) and $\mu_r$ the relative permeability of the substrate.

Thus, at for f=1 MHz and at room temperature:

δ≅120 μm for pure zinc,

δ≅70 μm for pure aluminium,

δ≅230 μm for pure lead,

δ≅20 μm for cast steel (ferromagnetic steel);

as a reminder, δ has a value of 700 μm in the case of 304-type stainless steel (UGINE).

It is therefore observed that, at 1 MHz, the standard skin depth for ferromagnetic steel and for cast steel is so small that the inductive signal is very sensitive to the slightest heterogeneities in the surface of the steel.

Thus, if the substrate consists of a ferromagnetic conducting material, such as bare steel, the signal delivered by the inductive sensor may be highly perturbed when the frequency is too high, that is to say when the standard skin depth does not reach at least 100 μm.

It is also observed that, at 1 MHz, the standard skin depth for a ferromagnetic conductive substrate having a paramagnetic metal layer on the surface of a thickness generally less than 100 μm is greater than the thickness of the metal layer on the surface of the substrate and the inductive signal is sensitive both to the heterogeneities in the paramagnetic metal layer and to those at the steel/metal layer interface.

Thus, if the substrate is made of a ferromagnetic conducting material, such as steel, coated with a non-ferromagnetic metal layer having a very different skin effect, the signal delivered by the inductive sensor may be highly perturbed while the standard skin depth remains greater than the thickness of the metal layer; in order for the skin depth to be less than the thickness of the metal layer, it would be necessary, conversely, to carry out the measurements at much higher frequencies; however, inductive sensors operating at such frequencies are much more expensive.

Despite an accurate prior calibration of the inductive sensor, for example, such as the one described in the document FR 2,707,109 already mentioned, the thickness datum delivered by the double-sensor device may therefore fluctuate by very large amounts that bear no relationship to the actual thickness of the insulating coating.

The Applicant has encountered this problem when carrying out measurement tests using a device which combines two sensors—an inductive sensor and a capacitive sensor.

The device used operates at a frequency of 1 MHz and includes algorithms for linearizing the response of the two sensors in the distance measurement range in question so that the difference between the linearized (or "calibrated") data from the two sensors pointed at a conducting substrate should correspond exactly to the thickness of an insulating coating applied to this substrate; this difference should be zero or close to zero if this substrate is not coated with an insulating layer.

A first series of tests consists in making a coating thickness measurement on bare metal strips, i.e. those which are not coated with an insulating layer; twenty-two equidistant reference marks, 5 cm apart, are made on the strip and an insulating coating thickness measurement is made each time a reference mark passes into the field of the sensors of the device; the difference between the linearized data from the two sensors should, within the inaccuracies of the sensors of the device, be zero for each reference mark since the strips tested are bare.

Plotted in FIG. 5 is the datum (in μm) given by the device, or insulating coating "thickness", as a function of the number of the reference mark on the strip for 3 types of bare metal strip, namely a stainless steel strip ("Stainless"; points in the form of triangles), a cold-rolled carbon steel ("Cold rolled"; points in the form of diamonds) and the same steel strip galvanized ("Galvanized" with a zinc thickness of approximately 15 μm; points in the form of squares).

It is found that the two-sensor device gives a datum which is close to zero and quite reproducible on a non-ferromagnetic stainless steel strip; the variation in the data over the reference marks does not exceed 2 μm.

A similar result would be expected on the other two types of strip.

However, for the cold-rolled carbon steel and even more for the carbon steel coated with a conducting layer, especially a metal layer, the variation in the datum given by the device reaches 8 μm in the first case and 18 μm in the second case; this clearly shows that in both these cases the data given by the two-sensor device can no longer be regarded as reliable, even though these sensors are nevertheless calibrated and "linearized".

Next, ferromagnetic steel sheet specimens coated with layers of zinc of varying thickness were prepared; plotted in FIG. 6 is the datum given by the same device as a function of the actual thickness (in μm) of zinc deposited on the steel sheet; it may be seen that the response of the device, the two sensors of which are nevertheless calibrated, is far from the actual insulating coating thickness value (in this case: zero) as the zinc thickness decreases; since the curve is very steep for a ferromagnetic steel substrate coated with an approximately 10 μm layer of zinc, it will be appreciated that the measurement of the thickness of an insulating coating on such a substrate will be very sensitive to the slightest fluctuations in the thickness of the subjacent metal coating, as illustrated in FIG. 7.

FIG. 7 shows the data given by the same device applied, on the one hand, to a bare chromium-plated steel roll and, on the other hand, on the same chromium-plated steel roll coated with an insulating paint layer; it may be seen that any fluctuations in the thickness of the paint layer are completely masked by the very high sensitivity of the device to the slightest fluctuations in thickness, in structure or in composition of the subjacent chromium layer.

The subject of the invention is therefore a method for accurately measuring, without any contact, the thickness of an insulating coating applied to a moving ferromagnetic conducting substrate, especially a steel sheet or roll which is bare or coated with a non-ferromagnetic metal layer, using two-sensor devices, such as those described in French Patent Application No. 2,707,109, in European Patent Application No. 0,629,450 or in German Patent Application DE 4,007, 363.

Apart from the question of the coating thickness measurement itself, in order to continuously regulate the thickness of a coating while it is being applied, use is made, in addition to the coating thickness measurement means, placed downstream of the application means, of an actuator for actuating the application means which is designed to vary the thickness of the coating depending on a control signal and on the electronic means for slaving the said actuator to the said measurement means depending on a set point signal corresponding to a predetermined desired thickness of coating.

When the coating is applied in the liquid state, the plant includes means for solidifying the coating downstream of the application means and of the conventional thickness measurement means, which conventional thickness measurement means, if they can only be used effectively or easily on solid coatings, must be placed further downstream of the solidification means.

The thickness-regulating means then do not allow the thickness to be regulated with a sufficiently short response time because the thickness measurement means are too far away from the coating application means.

SUMMARY OF THE INVENTION

The object of the invention is to solve the aforementioned drawbacks and offer the possibility of continuous, inexpensive, accurate and reliable measurements being easily made of the thickness of an insulating coating, even a liquid or pasty coating, on a moving ferromagnetic metal substrate, especially in a coating plant.

The subject of the invention is therefore a method for continuously measuring, without any contact, the thickness of an insulating coating while it is being applied to a metal substrate moving with respect to the means for applying the said coating, in which method, using input measurement means and output measurement means, in each of which two distance measurement sensors are combined, the first sensor of the said measurement means being an inductive-effect sensor and the second sensor of the said measurement means being adapted for measuring, without any contact, the distance to the surface of the substrate, whether or not it is coated:

- before the coating is applied and using input measurement means which are placed upstream of the point of application of the coating and are pointed at a zone on the substrate to be coated, at least one pair of measurements of the distance to the said zone is made,
- after the coating has been applied and using output measurement means which are placed downstream of the point of application of the coating and pointed at approximately the same zone on the now coated substrate, at least one other pair of measurements of the distance to the said zone is made,
- the difference between the at least one distance datum given by the first inductive sensor and the at least one distance datum given by the second sensor is calculated, both at the input measurement means and at the output measurement means for approximately the same substrate zone,
- the thickness of the coating applied to the said substrate zone is deduced, to within a possible corrective factor, by difference between the difference calculated at the output measurement means and the difference calculated at the input measurement means.

According to a preferred embodiment of the invention, the said metal substrate is ferromagnetic, the input measurement means defining a fixed input reference plane $P°_{ref,i}$ approximately parallel to the said substrate in the said region of the substrate to be coated and called the incoming measurement zone $Z_{B,i}$, the said pair of measurements is made before application, by measuring, at an input measurement mid-time $t_i$, on the one hand, by inductive effect, a value $d_{ind,i}$ which would correspond, if the said substrate were not ferromagnetic, to the distance between the said reference plane $P°_{ref,i}$ and that metal surface or interface $S_{met,i}$ of the substrate which faces it in the zone $Z_{B,i}$, and, on the other hand, without any contact, a value $d_{surf,i}$ which corresponds or would correspond, in the absence of a prior insulating coating on the surface of the substrate to be coated, to the distance between the said reference plane $P°_{ref,i}$ and that surface $S_{met,i}$ of the substrate which faces it in the zone $Z_{B,i}$, the output measurement means defining a fixed output reference plane $P°_{ref,o}$ approximately parallel to the said substrate in the said now-coated zone of the substrate and called the outgoing measurement zone $Z_{B,o}$, the said pair of measurements is made after application, by measuring, at a mid-time $t_o$ delayed from the time $t_i$ by a delay time $T_d$, in the same way as previously, a value $d_{ind,o}$ by inductive effect and a value $d_{surf,o}$ on the coated zone $Z_{B,o}$ of the substrate, the transit time for the moving substrate to move between the input measurement means and the output measurement means through means for applying said coating being equal to $T_t$, $T_d$ is chosen to be equal to $T_t$ so that the zones $Z_{b,i}$ and $Z_{B,o}$ correspond to the same substrate zone $Z_B$ before and after coating, and the average thickness $E_B$ of the coating applied to Zone $Z_B$ is then calculated and deduced, to within a possible corrective factor, using the formula:

$$E_B = \{[d_{ind,o} - d_{surf,o}] - [d_{ind,i} - d_{surf,i}]\}.$$

According to another preferred embodiment of the invention:

the said metal substrate is ferromagnetic, the input measurement means defining a fixed input reference plane $P°_{ref,i}$ approximately parallel to the said substrate in the said zone of the substrate to be coated and called the incoming measurement zone $Z_{B,i}$, the said pair of measurements is made before application, by measuring, at an input measurement mid-time $t_i$, on the one hand, by inductive effect, a series of N values $d_{ind,i}$ which would correspond, if the said substrate were not ferromagnetic, to the distance between the reference plane $P°_{ref,i}$ and that metal surface or interface $S_{met,i}$ of the substrate which faces it in the corresponding zones $Z_{B,i}$, and, on the other hand, without any contact, a series of N values $d_{surf,i}$ which correspond or would correspond, in the absence of a prior insulating coating on the surface of the substrate to be coated, to the distance between the said reference plane $P°_{ref,i}$ and that surface $S_{met,i}$ of the substrate which faces it in the corresponding zones $Z_{B,i}$, the output measurement means defining a fixed output reference plane $P°_{ref,o}$ approximately parallel to the said substrate in the said now-coated zone of the substrate and called the outgoing measurement zone $Z_{B,S}$, the said pair of measurements is made after application, by measuring, at a mid-time $t_o$ delayed from the time $t_i$ by a delay time $T_d$, in the same way as previously, a series of N values $d_{ind,o}$ by inductive effect and a series of N values $d_{surf,o}$ on the corresponding coated-substrate zones $Z_{B,o}$, the values $\bar{d}_{ind,i}$, $\bar{d}_{surf,i}$, $\bar{d}_{ind,o}$ and $\bar{d}_{surf,o}$ denoting the averages of the respective values $d_{ind,i}$, $d_{surf,i}$, $d_{ind,o}$ and $d_{surf,o}$ in each series of N measurements, the transit time for the moving substrate to move between the input measurement means and the output measurement means through means for applying the said coating being equal to $T_t$, $T_d$ is chosen to be sufficiently close to $T_t$ that the series of N zones $Z_{B,i}$ and the series of N zones $Z_{B,o}$ have at least 90% of successive substrate zones $Z_B$ in common before and after coating and thus correspond to approximately the same substrate zone before and after coating, the said successive substrate zones $Z_B$ forming a strand segment of substrate, and the average thickness $E_B$ of the coating deposited on the said strand segment of substrate is then calculated and deduced, to within a possible corrective factor, using the formula:

$$E_B\{[\bar{d}_{ind,o}-\bar{d}_{surf,o}]-[\bar{d}_{ind,i}-\bar{d}_{surf,i}]\}.$$

According to other possible characteristics of the invention:

In order to choose $T_d$ sufficiently close to $T_t$, the frequency of measurement in a series of N measurements corresponding to a sampling frequency $\upsilon$ and/or an integration time $\tau$, $\tau$ being related to $\upsilon$ by the equation $\tau=N/\upsilon$, $\tau$, N, $\upsilon$ or $|T_d-T_t|$ are chosen so as to satisfy the relationship:

$$\tau>10\times|T_d-T_t|,$$

$|T_d-T_t|$ denoting the maximum difference between the delay time $T_d$ and the transfer time $T_t$;

$\tau$ N, $\upsilon$ or $T_t$ are chosen so as to satisfy the relationship: $\tau<T_t/10$;

the values $d_{surf,i}$ and $d_{surf,o}$ are measured by capacitive effect and, the said coating to be applied having a predetermined relative dielectric constant $\epsilon_{app1}$, the corrective factor $[\epsilon_{app1}/(\epsilon_{app1}-1)]$ is applied to the calculated thickness $E_B$ of the coating;

the $d_{surf,i}$ and $d_{surf,o}$ values are measured by triangulation of light beams, especially LASER beam.

The subject of the invention is also a method for applying an insulating coating to a moving ferromagnetic metal substrate, in which the thickness of coating applied is regulated by adapting the thickness of coating applied as a function of a predetermined set value of the thickness and a measurement of the thickness applied, characterized in that the said thickness measurement is performed using the thickness method according to the invention.

The invention may also have one or more of the following characteristics:

when the said coating is applied in the liquid or pasty state and then solidified after application, the said measurements made after application are made before solidification;

the moving metal substrate is made of ferromagnetic steel;

the frequency of the inductive-effect measurement results in a standard skin depth in the said steel of less than 100 $\mu$m;

the said steel is coated with a paramagnetic metal layer, especially a layer of zinc, aluminium, chromium, tin or their alloys;

the frequency of the inductive-effect measurement causes a standard skin depth in the said layer of greater than the thickness of the said layer;

the moving substrate is a travelling strip; and the moving substrate is a rotating roll.

Finally, the subject of the invention is a plant for applying an insulating coating to a moving metal substrate, of the type comprising means for applying the coating, means for moving the substrate, which define a path along which the substrate travels through the said plant, and a device for continuously measuring the thickness of the coating applied by the application means, characterized in that the said device comprises:

measurement means which can be pointed at a measurement zone of the said travel path, in which means two distance measurement sensors are combined, the first sensor operating by inductive effect in order to measure the distance to a homogeneous non-ferromagnetic metal surface or interface placed in the said measurement zone, the second sensor being adapted for measuring the distance to a surface placed opposite the said sensor in the said measurement zone, the said measurement means being placed so as to face the same strand of the path along which the substrate travels, one of them on the input side upstream of the application means, and the other on the output side downstream of the application means, means for triggering the output measurement means after a delay of a time interval $T_d$ with respect to the time at which the input measurement means were triggered approximately equal to the transit time $T_t$ for the substrate to move between the measurement zone of the input measurement means and the measurement zone of the output measurement means, and means for calculating the difference between the at least one distance datum given by the inductive sensor and the at least one distance datum given by the second sensor, both at the input measurement means and at the output measurement means, these means being triggered after the delay time $T_d$, and for deducing the thickness of the coating applied to the substrate zone travelling through the said output measurement zone, to within a possible corrective factor, by difference between the difference calculated at the output measurement means and the difference calculated at the input measurement means.

The invention may also have one or more of the following characteristics:

the said second distance measurement sensor operates by capacitive effect;

the said second distance measurement sensor operates by triangulation of optical beams, especially LASER beam;

the application means are designed to apply a coating in the liquid or pasty state, the plant comprises means for solidifying the said coating, these being placed in the said travel path downstream of the said application means, and the output measurement means are positioned between the said application means and the said solidification means;

the coating plant furthermore includes means for regulating the thickness applied by the said application means, these being designed to act continuously as a function of the coating thickness measurement delivered by the said thickness measurement device.

BRIEF DESCRIPTIONS OF THE DRAWINGS

The invention will be more clearly understood on reading the description which follows, this being given by way of non-limiting example in the particular case of the coating of a metal strip, with reference to the following figures.

FIG. 6 shows the insulating coating thickness data given by two-sensor measurement means according to the prior art, applied to specimens of sheet coated with a layer of zinc varying in thickness; and FIG. 7 shows the insulating coating thickness data given by two-sensor measurement means according to the prior art, applied to a chromium-plated steel roll without any insulating coating on the one hand and coated with an insulating paint on the other hand.

DETAILED DESCRIPTION OF THE PREFERRED EMBODIMENTS

Figure 1:
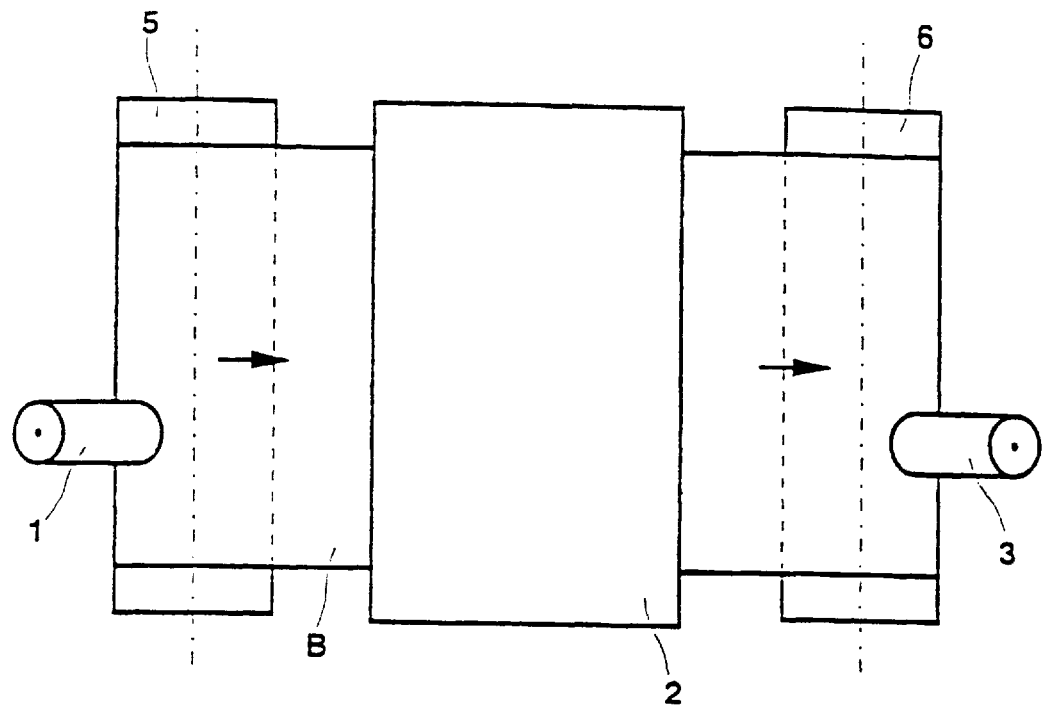
FIG. 1 is a top view of a strip coating plant according to the invention, with a measurement device according to the invention fitted.
Figure 2:
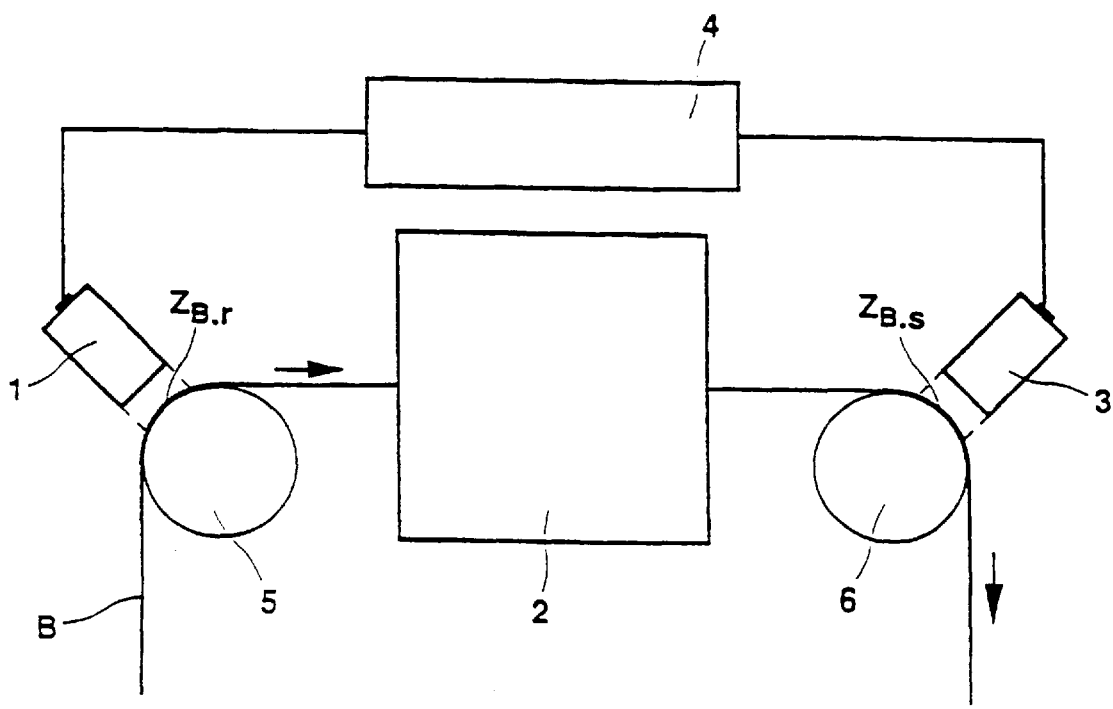
FIG. 2 is a side view of the plant of the plant in FIG. 1, in which the calculating means of the measurement device according to the invention are also shown.

As shown in FIGS. 1 and 2, the continuous strip coating plant comprises, going from the upstream end to the downstream end along a strip travel path which comprises a succession of strip support rolls, input measurement means 1, means 2 for applying an insulating coating to the strip, these being known per se, and output measurement means 3; this plant also includes means for making the strip travel continuously from the upstream end of the plant to the downstream end and means 4 for calculating the thickness of the coating applied.

The means 4 for calculating the thickness of the coating applied are linked to the input measurement means 1 and the output measurement means 3 which have already been mentioned, and are designed to synchronize these means and calculate the thickness of the coating applied, as indicated in the rest of the description.

The input measurement means 1 and the output measurement means 3 are substantially the same and are positioned and fixed at the same point in the width direction of the strip (and therefore opposite the same strand of strip) as shown in FIG. 1, the first means being upstream and the second means being downstream of the application means 2 with respect to the direction of travel of the strip, this being depicted by the arrows.

The thickness measurement device according to the invention therefore comprises the measurement means 1, 3 and the calculating means 4.

Each measurement means 1, 3 comprises an inductive sensor and, in this case, a capacitive sensor, these sensors being combined with an electronic device for supplying of power to these two sensors and for the acquisition of the signals therefrom.

The inductive sensor operates at a frequency of between 0.5 and 2 MHz.

Each measurement means 1, 3 therefore forms a double sensor.

The two sensors—inductive sensor and capacitive sensor—are fastened together and present a sensitive surface which faces the same zone of the strip's travel path, namely $Z_{B,i}$ in the case of the input side and $Z_{B,o}$ in the case of the output side.

This fixed sensitive surface is also called the thickness measurement reference plane, namely $P°_{ref,i}$ on the input side and $P°_{ref,o}$ on the output side.

The zones ($Z_{B,i}$ and $Z_{B,o}$) at which the sensors point preferably correspond to strip support rolls 5, 6 in the travel path, so that the distance between the reference planes ($P°_{ref,i}$ or $P°_{ref,o}$) and the underside of the strip (or the inner face in contact with these rolls) is substantially constant.

Figure 4:
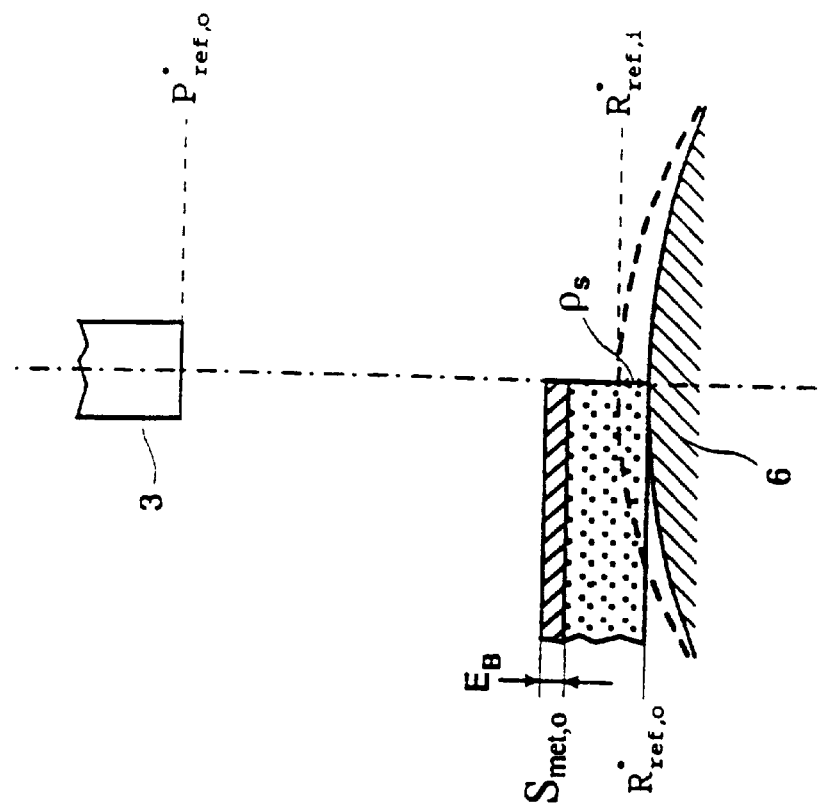
FIG. 4 shows, from the side and in cross section, a strip, after coating, travelling over a support roll opposite output measurement means in the coating plant shown in FIG. 1.
Figure 3:
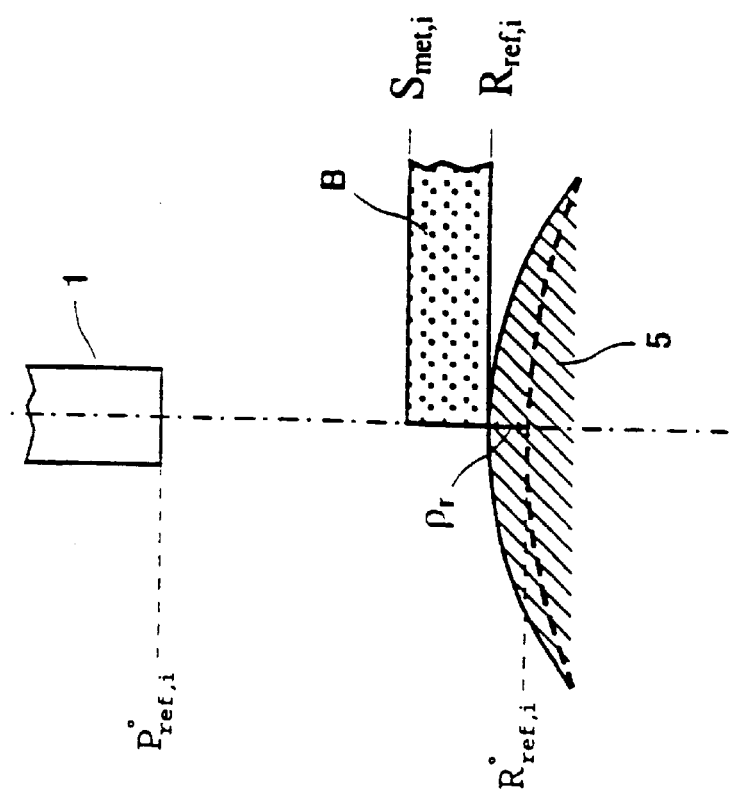
FIG. 3 shows, from the side and in cross section, a strip, before coating, travelling over a support roll opposite input measurement means in the coating plant shown in FIG. 1.
Figure 5:
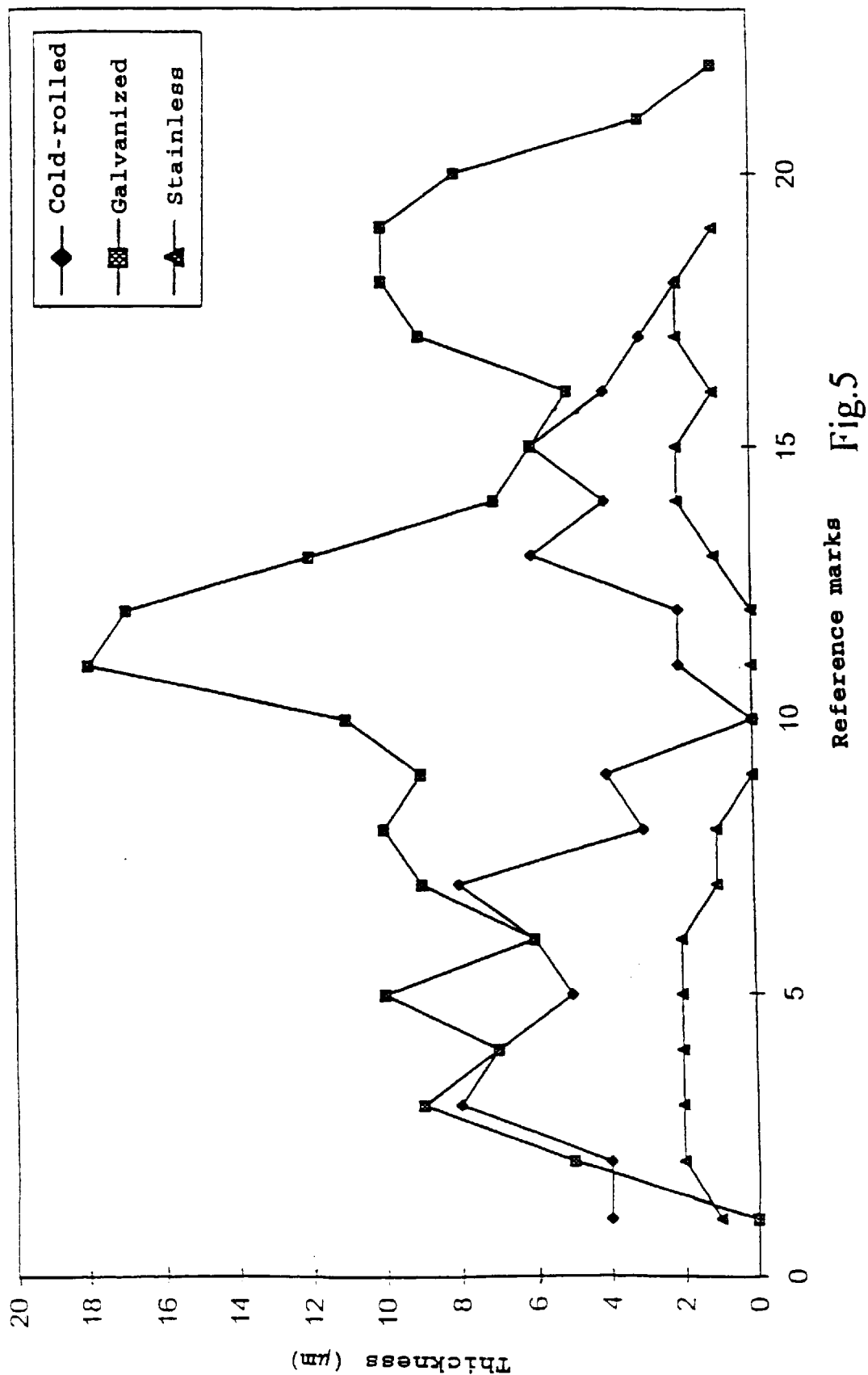
FIG. 5 shows the insulating coating thickness data given by two-sensor measurement means according to the prior art, applied to three types of travelling bare metal sheet.

This arrangement is shown in greater detail in FIGS. 3 and 4.

The position of the underside of the strip is identified by planes tangential to these rolls 5, 6 at the point of contact between strip and roll in the measurement zones, namely $R_{ref,i}$ on the input side for the zone $Z_{B,i}$ and $R_{ref,o}$ on the output side for the zone $Z_{B,o}$.

As shown in FIGS. 3 and 4, the distance between the reference planes ($P°_{ref,i}$ or $P°_{ref,o}$) and the inner face of the travelling strip which is in contact with these rolls is therefore expressed by: distance ($P°_{ref,i}-R_{ref,i}$) on the input side and the distance ($P°_{ref,o}-R_{ref,o}$) on the output side.

Calling the position of the planes tangential to the rolls (always in the measurement zones) corresponding to their nominal diameter $R°_{ref,i}$ and $R°_{ref,o}$ and calling the instantaneous eccentricities of the input roll and of the output roll, respectively, $\rho_i(t)$ and $\rho_o(t)$, then we may write:

$$\text{distance } (P°_{ref,i}-R_{ref,i}) = \text{distance } (P°_{ref,i}-R°_{ref,i})-\rho_i(t)$$

$$\text{distance } (P°_{ref,o}-R_{ref,o}) = \text{distance } (P°_{ref,o}-R°_{ref,o})-\rho_o(t)$$

the distances ($P°_{ref,i}-R°_{ref,i}$) and ($P°_{ref,0}-R°_{ref,o}$) corresponding to constant nominal distances at which the input measurement means 1 and the output measurement means 3 facing the corresponding strip support rolls 5 and 6 have been fixed.

Since the input measurement means 1 and output measurement means 3 are positioned on the same side of the strip, they are easier to install in the plant and can be easily moved over the entire width of the strip, depending on the strand of the strip on which it is desired to measure the thickness of the coating applied.

The inductive sensor and the electronic device associated with the input measurement means 1 are designed, in a manner known per se, especially after calibration, to measure a value $d_{ind,i}$ corresponding to the distance separating the reference plane $P°_{ref,i}$ from the closest conducting or metal surface $S_{met,i}$ passing through the field of the sensor, opposite to said reference plane $P°_{ref,i}$, in the measurement zone $Z_{B,i}$, in the case in which the incoming strip is homogeneous, metallic and paramagnetic (whether or not provided with an insulating coating).

We may therefore write:

$$d_{ind,i} = \text{distance } (P°_{ref,i}-S_{met,i}).$$

Calibration of the inductive sensor is carried out, in a manner known per se, in order to "linearize" the response of the sensor so that the measured value $d_{ind,i}$ corresponds well to the distance separating the plane $P°_{ref,i}$ from the surface $S_{met,i}$ over the entire measurement range desired.

The measurement range of the inductive sensor varies depending on the thickness of the strips travelling through the plant and on the eccentricity $\rho_i(t)$ of the strip support roll 5.

If the strip entering the field of the sensor has an insulating coating, the input inductive sensor measures the distance separating the reference plane $P_{ref,i}$ of the metal/coating interface $S_{met,i}$ of the zone $Z_{B,i}$ of the strip.

If the incoming strip is ferromagnetic, the skin effects are exacerbated and the slightest surface heterogeneity causes perturbations in the measured value $d_{ind,i}$; the measured value $d_{ind,i}$ given by the calibrated sensor is then only an "apparent" distance which fluctuates as the strip travels along, without any relationship between the actual distance separating $P_{ref,i}$ from the surface $S_{met,i}$.

We may then write:

$$d_{ind,i} \neq \text{distance } (P°_{ref,i} - S_{met,i}).$$

If the ferromagnetic incoming strip is coated with a thin paramagnetic metal layer, such as a layer of zinc, aluminium, tin or chromium (or their alloys), these perturbations are even greater, especially if the thickness of the metal layer remains less than the skin depth of the radiation emitted by the inductive sensor.

Thus, the inductive sensor generates and measures, remotely, a magnetic induction and/or eddy currents in a zone $Z_{B,i}$ of the incoming strip, opposite the sensitive surface of the sensor, and deduces an apparent distance value $d_{ind,i}$.

The inductive sensor and the electronic device associated with the output measurement means 3 are likewise designed to measure an apparent distance $d_{ind,o}$ separating the corresponding reference plane $P°_{ref,o}$ of the closest conducting or metal surface $S_{met,o}$ passing through the field of the sensor, opposite the said reference plane $P°_{ref,o}$ in a strip zone $Z_{b,o}$ on the output side of the plant.

At the input measurement means 1, the distance between the underside of the strip and the metal surface $S_{met,i}$ is denoted by $D_{B,i}=\text{distance }(R_{ref,i}-S_{met,i})$; $D_{B,i}$ therefore corresponds to the thickness of the substrate in the zone $Z_{B,i}$.

Likewise, at the output measurement means 3, the distance between the underside of the strip and the metal surface $S_{met,o}$ is denoted by $D_{B,o}=\text{distance }(R_{ref,o}-S_{met,o})$; $D_{B,o}$ therefore corresponds to the thickness of the substrate in the zone $Z_{B,o}$.

If the time $t_o$ at which the output measurement is made is delayed with respect to the time $t_i$ at which the input measurement is made by a delay time $T_d$ chosen to be exactly equal to the transit time $T_t$ of the strip in the plant between the input measurement means 1 and the output measurement means 3, the output measurement zone $Z_{B,o}$ and the input measurement zone $Z_{B,i}$ correspond to the same strip zone $Z_B$.

Thus, $D_{B,i}=D_{B,o}$, this being so, moreover, whatever the fluctuations in the thickness of the strip or in that of a coating already deposited on the inner face (which would form part of the substrate).

The $D_{B,i}=D_{B,o}$ common value is denoted by $D_B$.

Therefore, if the strip entering the plant is a homogeneous paramagnetic strip, which enters the plant bare (FIG. 3) and leaves it coated (FIG. 4), the inductive sensors measure:

on the input side:

$$d_{ind,i}=\text{distance }(P°_{ref,i}-S_{met,i})=[\text{distance }(P°_{ref,i}-R_{ref,i})-D_B]$$

and on the output side:

$$d_{ind,o}=\text{distance }(P°_{ref,o}-S_{met,o})=[\text{distance }(P°_{ref,o}-R_{ref,o})-D_B].$$

Moreover, since (cf. above) we have:

distance $(P°_{ref,i}-R_{ref,i})=\text{distance }(P°_{ref,i}-R°_{ref,i})-\rho_i(t_i)$ distance $(P°_{ref,o}-R_{ref,o})=\text{distance }(P°_{ref,o}-R°_{ref,o})-\rho_o(t_o)$, the difference $d_{ind,o}-d_{ind,i}$ is therefore equal to:

$$[\text{distance }(P°_{ref,o}-R°_{ref,o})-\text{distance }(P°_{ref,i}-R°_{ref,i})]-[\rho_o(t_o)-\rho_i(t_i)].$$

The first term, [distance $(P°_{ref,o}-R°_{ref,o})$ distance $(P°_{ref,i}-R°_{ref,i})$], retains a constant value, denoted by F°, which depends on the fixing of the components in the plant (especially the rolls 5, 6 and the measurement means 1. 3).

Thus, $[d_{ind,o}-d_{ind,i}]=F°+[\rho_o(t_o)-\rho_i(t_i)]$.

In the same configuration, if the strip entering the plant is ferromagnetic, whether or not it has been precoated with a metal layer of a different kind, even though, however, the input inductive measurement $d_{ind,i}\neq\text{distance }(P°_{ref,i}-S_{met,i})$ and the output inductive measurement $d_{ind,o}\neq\text{distance }(P°_{ref,o}-S_{met,o})$, it is found that the difference between the two measurements $[d_{ind,o}-d_{ind,i}]$ has the same value as previously, namely $F°+[\rho_o(t_o)-\rho_i(t_i)]$.

We may therefore also write:

$[d_{ind,o}-d_{ind,i}]=[\text{distance }(P°_{ref,o}-S_{met,o})-\text{distance }(P°_{ref,i}-S_{met,i})]$.

This observation, which is at the basis of the invention, stems from the fact that the same perturbations due to the nature of the strip affect both the $d_{ind,i}$ measurement and the $d_{ind,o}$ measurement; this is because, these measurements are carried out on the same strip zone $Z_B$ and are therefore affected by perturbations of the same magnitude, which are eliminated by subtraction.

The capacitive sensor and the associated electronic device of the input measurement means 1 are designed, in a manner known per se, to measure a value $d_{cap,i}$ corresponding to the thickness of an air layer separating the reference plane $P°_{ref,i}$ from a conducting metal surface travelling through the measurement zone $Z_{B,i}$.

Assuming that the capacitive sensor is provided with a plane electrode in the plane $P°_{ref,i}$ of the input measurement means 1 and that this electrode faces a parallel, metallic and conducting surface $S_{met,i}$, then $P°_{ref,i}$ and $S_{met,i}$ form the two electrodes of a capacitor.

The electronic means associated with the capacitive sensor are designed, in a manner known per se, to measure the capacitance $C_i$ of this capacitor and, if $P°_{ref,i}$ and $S_{met,i}$ are separated only by air, to deduce, from this measured capacitance $C_i$, a value $d_{cap,i}$ corresponding to the distance $(P°_{ref,i}-S_{met,i})$.

This deduction is made using a relationship of the type:

$C_i=\epsilon_0 \cdot [\text{Area of the electrodes}]/d_{cap,i}$ where $\epsilon_0$ is the absolute dielectric constant of air.

Thus, in the case in which a bare conducting strip is travelling past the sensor, in the zone $Z_{B,i}$, the $d_{cap,i}$ measurement made by the sensor satisfies the relationship:

$$d_{cap,i}=\text{distance }(P°_{ref,i}-S_{met,i}).$$

On the other hand, if the strip travelling through the zone $Z_{B,i}$ is already coated with an insulating layer, $d_{cap,i} \neq$ distance $(P°_{ref,i} - S_{met,i})$.

In fact, if this insulating layer has a relative dielectric constant $\epsilon_1$ and a thickness $E_1$, the capacitor $C_i$ measured by the sensor is formed from the superposition of two layers:

- a dielectric layer $\epsilon_1$ of thickness $E_1$ corresponding to a capacitance $C_{diel}$ and
- a layer of air of thickness=[distance $(P°_{ref,i} - S_{met,i}) - E_1$] corresponding to a capacitance $C_{air}$.

We may therefore write the equation $$1/C_i = 1/C_{diel} + C_{air}$$

from which it may be deduced that:

$$d_{cap,i} = [\text{distance } (P°_{ref,i} - S_{met,i}) - E_1] + E_1/\epsilon_1.$$

It may be noted that, if $\epsilon_1 \gg 1$, then $d_{cap,i} \# $ [distance $(P_{ref,i} - S_{met,i}) - E_1$], which means that the capacitive sensor "sees", as previously, the surface of the strip (which in this case is insulating).

The capacitive sensor and the associated electronic device of the output measurement means 3 are likewise designed to deduce in the same way a measured value $d_{cap,o}$ from the measurement of a capacitance $C_o$.

The operation of the coating plant will now be described as well as how the thickness $E_B$ of coating applied to a strip zone $Z_B$ immediately after the application means 2 may be continuously measured.

In a first way of implementing the invention, a ferromagnetic metal strip B, especially a steel strip, which may or may not be coated with a paramagnetic metal layer, such as a layer of zinc, aluminium, chromium, tin or their alloys, is made to travel through the plant in order to apply an insulating layer thereto.

The dielectric constant $\epsilon_{app1}$ of the layer applied by the application means 2 is assumed to be known.

Assuming, as previously, that the time $t_o$ at which the output measurement is made is delayed with respect to the time $t_i$ at which the input measurement is made by a delay time $T_d$ corresponding exactly to the transit time $T_t$ of the strip in the plant the output measurement zone $Z_{B,o}$ and the input measurement zone $Z_{B,i}$ correspond to the same "measured" strip zone $Z_B$.

According to the invention, $E_B$ may then be deduced from the equation:

$$E_B = [\epsilon_{app1}/(\epsilon_{app1}-1)] \times \{[d_{ind,o} - d_{cap,o}] - [d_{ind,i} - d_{cap,i}]\},$$

where $d_{ind,i}$ and $d_{cap,i}$ are the measured values delivered by the input measurement means 1 and $d_{ind,o}$ and $d_{cap,o}$ are the measured values delivered by the output measurement means 3.

This equation giving $E_B$ may be confirmed in the following manner:

the above equation is converted into:

$$E_B = [\epsilon_{app1}/(\epsilon_{app1}-1)] \times \{[d_{ind,o} - d_{ind,i}] - [d_{cap,o} - d_{cap,i}]\}.$$

To begin with, let us consider the first term, namely $[d_{ind,o} - d_{ind,i}]$.

Since the output measurement zone $Z_{B,o}$ and the input measurement zone $Z_{B,i}$ correspond to the same strip zone $Z_B$, then, as previously:

$$[d_{ind,o} - d_{ind,i}] = [\text{distance } (P°_{ref,o} - S_{met,o}) - \text{distance } (P°_{ref,i} - S_{met,i})].$$

Next, let us consider the second term, namely $[d_{cap,o} - d_{cap,i}]$.

Since the strip entering the plant does not have an insulating coating, then $d_{cap,i} = $ distance $(P°_{ref,i} - S_{met,i})$.

Since the strip leaving the plant is provided with an insulating coating, the thickness $E_B$ of which is it desired to determine, we may write:

$$d_{cap,o} = [\text{distance } (P°_{ref,o} - S_{met,o}) - E_B] + E_B/\epsilon_{app1}.$$

Then the difference $[d_{cap,o} - d_{cap,i}]$ is then equal to:

$$[\text{distance } (P°_{ref,o} - S_{met,o}) - \text{distance } (P°_{ref,i} - S_{met,i})] - E_B \times [(\epsilon_{app1} - 1)/\epsilon_{app1}].$$

Bringing the first and second terms of the equation together, we may write:

$$\{[d_{ind,o} - d_{ind,i}] - [d_{cap,o} - d_{cap,i}]\} = E_B \times [(\epsilon_{app1} - 1)/\epsilon_{app1}],$$

thereby confirming the above equation for $E_B$.

The means 4 for calculating the thickness of coating applied are designed to calculate $E_B$ from this equation.

Advantageously, it is found that the problems of perturbations of the inductive sensors due to the ferromagnetic character of the strip and/or to its surface heterogeneities, especially those that a paramagnetic metal layer have, are completely eliminated.

Likewise, problems of thermal drift which generally arise with inductive sensors are eliminated.

Advantageously, it is found that the problems of the eccentricities $\rho_o$ and $\rho_o$ of each strip support roll at the input measurement means and the output measurement means are completely eliminated, whatever the magnitude of these eccentricities.

In a second way of implementing the invention, if the ferromagnetic metal strip to be coated is already coated with an insulating layer, the $E_B$ measurement is made in the same way, from the same equation and from the same measurements.

Let $E_{ins}$ be the thickness and $\epsilon_{ins}$ the dielectric constant of this prior insulating coating layer.

Since the strip entering the plant already has an insulating coating, we may write (see above):

$$d_{cap,i} = [\text{distance } (P°_{ref,o} - S_{met,o}) - E_{ins}] + E_{ins}/\epsilon_{ins}.$$

Since the strip leaving the plant is endowed with a second insulating coating, the thickness $E_B$ of which it is desired to determine, the following equation may be written:

$$d_{cap,o} = [\text{distance } (P°_{ref,o} - S_{met,o}) - E_{ins} - E_B] + E_{ins}/\epsilon_{ins} + E_B/E_{app1}.$$

The difference $[d_{cap,o} - d_{cap,i}]$ then being expressed as previously, we again have:

$$[d_{cap,o} - d_{cap,i}] = [d_{ind,o} - d_{ind,i}] - E_B \times [(\epsilon_{app1} - 1)/\epsilon_{app1}] \text{ and the equation for } E_B \text{ is unchanged.}$$

Advantageously, it is therefore found that the thickness of coating applied in the application means 2 may be measured even if the incoming strip is already coated with an insulating layer and even without the characteristics of this insulating layer being known.

According to a variant of the invention, instead of capacitive sensors, the input and output measurement means comprise other types of sensors designed to measure the distance separating them from a surface placed opposite them; the data given by these sensors are then $d_{surf,i}$ and $d_{surf,o}$ instead of $d_{cap,i}$ and $d_{cap,o}$.

In particular, optical sensors, designed to measure the distance separating the reference planes $P°_{ref,i}$ and $P°_{ref,o}$ from the surface of the strip in the measurement zones $Z_{B,i}$ and $Z_{B,o}$, respectively, may be used.

These optical sensors are known per se and will not be described here in detail; for example, they may be sensors operating by triangulation of laser beams which are directed at and reflected from the surface of the strip in the measurement zones.

This variant may be used when the surface of the strip is sufficiently reflective both on the input side and on the output side of the plant.

In this case, the thickness of the coating deposited on a strip zone $Z_B$ may be written more simply as: $E_B=\{[d_{ind,o}-d_{opt,o}]-[d_{ind,i}-d_{opt,o}]\}$, and therefore without the corrective factor $[\epsilon_{app1}/(\epsilon_{app1}-1)]$ specific to the capacitive sensors, where $d_{opt,i}$ and $d_{opt,o}$ are the distance measurements delivered by the input optical sensor and the output optical sensor, respectively.

As will be seen, at this still incomplete stage of the description, implementation of the invention assumes that the time $t_o$ at which the output measurements are made can always be delayed with respect to the time $t_i$ at which the input measurements are made by a measurement delay time $T_d=t_o-t_i$ corresponding exactly to the transit time $T_t$ of the strip in the plant between the input measurement means 1 and the output measurement means 3.

If the strip travels through the plant at the speed $V_B$ and if the length of the path of the strip between the input measurement means and the output measurement means—or transit length—is $L_t$, the transit time $T_t$ of the strip in the plant is $L_t/V_B$.

In practice, for a measurement frequency of 400 Hz and for a strip speed of 1 m/s for example, the distance separating two successive measurement zones on the strip will be (1/400) m, i.e. 2.5 mm.

Thus, if the measurement zone extends over 2 to 3 mm, the entire surface of a strand of a strip is thoroughly explored, along the entire length of the travelling strip, by the thickness measurement device according to the invention.

However, in order for there to be strict correspondence between an output measurement zone $Z_{B,o}$ and an input measurement zone $Z_{B,i}$, the transit length $L_t$ must be known with an accuracy of the order of one millimeter (which means an error of less than 0.1% in the speed), something which cannot in practice be achieved.

This is because the transit length $L_t$ is such that simple variations in the tension in the strip may cause this length to vary by far more than one millimeter!

If a constant delay time $T_d$ is used, small variations in the speed $V_B$ at which the strip is travelling are enough for the input measurement zone $Z_{B,i}$ and the output measurement zone $Z_{B,o}$ of the same strip zone $Z_B$ to no longer coincide.

In practice, and again according to the invention, the operation uses series of measurements, namely series of N measurements $d_{ind,i}$ and $d_{cap,i}$ on the input side at a mid-time $t_i$ and series of N measurements $d_{ind,o}$ and $d_{cap,o}$ on the output side and a mid-time $t_o$, and then $E_B$ is calculated as previously, by successively replacing $d_{ind,i}$, $d_{cap,i}$, $d_{ind,o}$ and $d_{cap,o}$ with the values of the averages of the corresponding series, $\bar{d}_{ind,i}$, $\bar{d}_{cap,i}$, $\bar{d}_{ind,o}$ and $\bar{d}_{cap,o}$, in the expression for $E_B$.

According to the invention, we may then write: $E_B(t)=[\epsilon_{app1}/(\epsilon_{app1}-1)]\times\{[\bar{d}_{ind,o}-\bar{d}_{cap,o}]$ (measured at $t_o$)$-[\bar{d}_{ind,i}-\bar{d}_{cap,i}]$ (measured at $t_i$)$\}$.

This adaptation of the method can be transposed to the case in which the capacative sensors are replaced with optical sensors.

The time t corresponds to the mid-time of the coating operation carried out by the means 2 for applying the coating to a series of successive strip zones $Z_B$.

The set of successive zones $Z_B$ of a series therefore contains all the measurement points from the same series and therefore extends over a strand segment of the strip.

Knowing that the time $t_i$ corresponds to the mid-time at which the said strand segment of the strip passes through the input measurement means 1, the time t may be deduced from $t_i$ as a function of the transit time $T_a$ of the said strand segment of the strip between the input measurement means 1 and the coating of the same strand in the application means 2; thus, $t \cong t_i+T_a$.

Still according to the invention, the mid-time $t_o$ of the series of output measurements $[\bar{d}_{ind,i}, \bar{d}_{cap,o}]$ is delayed with respect to the mid-time $t_i$ of the series of input measurements $[\bar{d}_{ind,i}, \bar{d}_{cap,i}]$ by a measurement delay time $T_d=t_o-t_i$ which is chosen to be as close as possible to the value $T_t$ of the transit time for the strip to pass between the input measurement means 1 and the output measurement means 3 (therefore $T_d \cong T_t$).

It is important in fact for the series of N successive input measurement zones $Z_{B,i}$, of the substrate to be coated and the series of N output measurement zones $Z_{B,o}$ of the coated substrate to have as large a number as possible, preferably at least 90%, of successive strip zones $Z_B$ in common.

If τ denotes the integration time for each series of measurements, i.e. the time over which an average is made for a series of N measurements, it is preferable to choose $\tau > 10\times|T_d-T_t|$, where $|T_d-T_t|$ denotes the maximum deviation between $T_d$ and $T_t$, which results, for example, from the instability in the strip speed $V_B$ or from fluctuations in the transit length $L_t$.

Thus, each calculation of the coating thickness $E_B(t)$ therefore incorporates, among the N measurements of each series, at most $N_e$ output measurements $d_{ind,o}$ and $d_{cap,o}$ made on outgoing zones $Z_{B,o}$ which correspond to no incoming zone $Z_{B,i}$ of the series of input measurements $d_{ind,i}$ and $d_{cap,i}$.

$N_e$ is then given by the equation:

$$N_e=|T_d-T_t|\times N/\tau.$$

The condition $\tau>10\times|T_d-T_t|$ may therefore be written as $N_e/N<1/10$, which means that, in a series of output measurements made at the time $t_o$ and in a series of input measurements made at the time $t_i$, it is acceptable for 10% of the measurements not to correspond (i.e. not to correspond to the same strand segment of strip).

For example, for a constant time delay $t_d=2$ seconds and a transit time $T_t$ of approximately 2 seconds (the case in which $L_t \cong 2$ m and $V_B \cong 1$ m/s), and if the maximum relative fluctuations in the strip speed $V_B$ or in the transit length $L_t$ are 0.5%, then, at most, $|T_d-T_t|=T_t\times 0.5\%=0.01$ s and the condition on τ is then expressed as: $\tau>10\times0.01$ s, i.e. $\tau>0.1$ s.

Moreover, in order to avoid too long a response time, it is important for the integration time τ to represent only a fraction of the transit time $T_t$ of the strip between the input measurement means 1 and the output measurement means 3.

Preferably, $\tau$ is chosen so that $\tau > T_t/10$.

In practice, $\tau$ is chosen such that $T_t/100 < \tau < T_t/10$, which means that there are generally between 10 and 100 measurement series during the transit time $T_t$.

This condition may be expressed in another equivalent way: if $\upsilon$ is the frequency of measurement or sampling frequency of the measurement means 1, 3 (thus $\tau = N/\upsilon$) and if $T_t$ is the transit time for the strip to pass between the input measurement means 1 and the output measurement means 3, the number N of measurements in each series $[\overline{d}_{ind,i}, \overline{d}_{cap,i}]$ or $[\overline{d}_{ind,o}, \overline{d}_{cap,o}]$ is preferably chosen according to the relationship:

$$\upsilon \cdot T_t/100 < N < \upsilon \cdot T_t/10.$$

The sensors of the input and output means preferably have response times less than the inverse of the frequency of measurement or sampling frequency $\upsilon$: for example, for a sampling frequency $\upsilon = 400$ Hz, the response times will preferably be less than $0.25 \times 10^{-2}$ s.

Thus, if the number N of measurements in each series is 40, if the strip travels through the plant at a speed $V_B = 1$ m/s and if the sampling frequency $\upsilon$ is 400 Hz, then the strip zone $Z_B$ or the strand segment of strip on which a calculation of the average coating thickness $E_B(t)$ is made according to the invention has a length of $40/400$ Hz$\times 1$ m/s$=10$ cm (in the direction of travel).

The preferred choice of the integration time $\tau$ in the relationship $T_t/100 < \tau < T_t/10$, in which the transit time $T_t$ is $L_t/V_B$, i.e. 2 seconds (for $V_B = 1$ m/s and $L_t = 2$ m), then gives the relationship:
0.02 s $< \tau <$ 0.2 s.

The preferred choice of N in the relationship $\{\upsilon \cdot T_t/100 < N < \upsilon \cdot T/10\}$ is then expressed as:

$$(\upsilon \cdot L_t)/(100 \cdot V_B) < N < (\upsilon \cdot L_t)/(1.0 \cdot V_B),$$

which, with the same data as previously for $\upsilon$ and $V_B$ and with a transit length $L_t = 2$ m, gives $8 < N < 80$.

In a manner known per se, the calculating means 4 connected to the input measurement means 1 and the output measurement means 3 are designed to control (and delay) the series of measurements in order to calculate the averages per series of measurements, and even to calculate the variances (and standard deviations), and to deduce therefrom the thickness of the coating applied by the application means 2 at the time t from the above relationship for $E_B(t)$ according to the invention.

According to a variant of the invention, the delay time $T_d$ may be varied so that it remains as close as possible to the transit time $T_t$, thereby improving the accuracy of the calculation of the thickness $E_B$.

Thus, the invention allows a continuous, accurate and precise measurement of the thickness of an insulating coating applied continuously to a ferromagnetic metal substrate (strip or roll) to be easily obtained, even if this substrate is provided on the surface with a paramagnetic metal layer.

The device according to the invention allows inexpensive inductive sensors to be used, both on bare steel and on steel coated with a metal layer having a thickness of less than 100 $\mu$m.

The method according to the invention remains simple to implement, especially by virtue of the processing of the local thickness measurements in series, which avoids too great a constraint in terms of synchronizing the input measurement means with the output measurement means.

The invention applies to any type of ferromagnetic substrates, irrespective of whether their prior coating is a non-ferromagnetic metal or is even an insulator.

If capacative sensors are used, the invention makes it possible to measure the thickness of a coating during its application as long as the value of its dielectric constant $\epsilon_{app1}$, (at the output measurement point) is known, and the greater this dielectric constant, the greater is the accuracy of the thickness measurement.

By way of indication, if coatings are applied in the liquid state, the value of this dielectric constant is high for aqueous media ($\epsilon_{app1} = 80$), about 4 for dispersion-type liquid paints ("organosols" or "plastisols" such as of polyvinyl chloride) and between 6 and 10 for solution-type liquid paints (such as polyester paints).

The device according to the invention makes it possible to measure coating thicknesses at least in a range from 1 to 200 $\mu$m and, for dielectric constants of between 4 and 10, makes it possible to achieve an accuracy of the order of 1 $\mu$m in the thickness of the coating applied.

Advantageously, the principle of the thickness measurement (by a difference) makes it possible to overcome any thermal drift in the inductive sensors (this drift being compensated for between the input and the output).

The calibration of the device according to the invention is easy to carry out and does not require knowledge of any particular information about the substrate or the strip to be coated (for example, its thickness and whether or not it has been precoated with an insulating coating).

The measurement means 1, 3, being both placed on the same side of the strip, are easy to install, even as close as possible to the application means 2, even on a device which allows them to move over the entire width of the substrate (strip or roll), while still maintaining the same measurement accuracy.

This thickness measurement device according to the invention operates continuously while the coating is being applied.

The response time $T_{resp}$ of this device is, in this case, $T_{resp} \cong T_b + \tau$, where $\tau$ is the integration time and $T_b$ is the transit time for the strip to pass between the application means 2 and the output measurement means (thus, $T_t = T_a + T_b$).

There are therefore two possible ways of shortening the response time:

either the integration time $\tau$ is reduced (while still preferably meeting the abovementioned conditions on $\tau$);

or the time $T_b$ is shortened, i.e. the output measurement means 3 are placed as close as possible to the application means 2.

Placing the output measurement means 3 in the immediate vicinity of the application means 2 is possible here, even if the applied coating is still liquid and has not yet solidified on leaving the application means 2.

This possibility is offered provided here because, in particular, the output measurement means 3 operate without any contact with the travelling strip B.

Advantageously, the invention therefore allows the thickness of a coating still in the liquid or pasty state to be measured.

According to an advantageous variant of the invention, if a coating is being applied in the liquid state and the measurement means 1, 3 comprise capacitive sensors, the coating plant also includes, in addition to the means for supplying the application means 2 with the coating liquid or paste, means for automatically and continuously measuring the dielectric constant $\epsilon_{app1}$ of the liquid or paste before it is applied to the substrate (the strip or roll).

By way of a non-limiting example of an embodiment of this variant, the plant then includes a coaxial capacitive probe, which is mounted in the circuit for supplying the application means through which the coating liquid or paste flows, and an electronic device designed to continuously measure the dielectric constant $\epsilon_{app1}$ of the product flowing through the probe.

This electronic device associated with the probe is, in this case, linked to the calculating means 4 so that the measured value $\epsilon_{app1}(t)$ is taken into account in the calculation of the thickness $E_B(t)$ of the coating applied.

Thus, since the calculation of the thickness of the coating applied takes into account the instantaneous value of the dielectric constant $\epsilon_{app1}$ of the product applied, the measurement device according to the invention is not perturbed by fluctuations in the composition of the product applied.

Thus, an essential advantage of the invention is that it offers a device and a method for continuously measuring the thickness with a rapid response, even if a coating is applied in the liquid or pasty state.

If a coating is applied in the liquid or pasty state, the application means 2 comprise, for example, a polymer-melt extrusion head or a paint or lacquer coating head.

Advantageously, the device and method according to the invention can be used to control the application means 2: the plant then includes an actuator designed to vary the thickness of the coating applied and a thickness regulator; the actuator, the regulator and the device according to the invention then form a closed loop designed to control to a predetermined level the thickness of the coating applied.

In this configuration, the speed of response (short $T_{resp}$) is a key element in the performance of the plant.

If a coating is applied in the liquid or pasty state, the coating applied is solidified after the actual application of the coating in the application means 2.

The coating plant then includes, downstream of the application means, means for solidifying the coating applied.

The means for solidifying the coating applied are tailored to the nature of the coating and to the method of application to the substrate (strip or roll); for example, they are drying means in the case of the application of a liquid paint, or curing means in the case of the application of a thermosetting polymer coating, or cooling means in the case of the application of a polymer melt.

However, in the thickness measurement methods of the prior art, especially contact methods, only the thickness of solidified coatings could be measured, and the thickness measurement means could be installed only downstream of the solidification means, which meant very long response times.

By virtue of the invention, the measurement means (in this case the output measurement means 3) may be installed immediately at the exit of the application means 2, therefore upstream of the solidification means, and the response time $T_{resp}$ of the thickness measurement device is considerably shortened thereby allowing the quality of the coating applied to be improved, especially in terms of the evenness of the thickness.

What is claimed is:

1. A method for continuously measuring, without any contact, the thickness of an insulating coating while the insulating coating is being applied to a moving metal substrate, using measurement means comprising input measurement means and output measurement means each including first and second distance measurement sensors, said method comprising:

moving the metal substrate successively into a field of the input measurement means, to means for applying the coating, and then into a field of the output measurement means, the first distance measurement sensor of each of the input and output measurement means being an inductive effect sensor and the second distance measurement sensor of each of the input and output measurement means being configured to measure the distance to the surface of the substrate without any contact;

making a first pair of measurements of the distance to a zone of the substrate before applying the coating on the zone of the substrate using respectively the first and second distance measurement sensors of the input measurement means;

applying the insulating coating on the zone of the metal substrate;

making a second pair of measurements of the distance to the zone after application of the insulating coating to the zone, using respectively the first and second distance measurement sensors of the output measurement means;

calculating a first difference between the first pair of measurements;

calculating a second difference between the second pair of measurements;

determining a thickness of the coating applied to the zone, to within a possible corrective factor from a difference between the first difference and the second difference.

2. A method for applying an insulating coating to a moving ferromagnetic metal substrate, in which the thickness of coating applied is regulated by adapting the thickness of the coating applied as a function of a predetermined value of the thickness and of a measurement of the thickness applied, wherein the thickness measurement is performed using the method according to claim 1.

3. A method according to claim 1, wherein the moving substrate is a rotating roll.

4. A method for continuously measuring, without any contact, the thickness of an insulating coating while the insulating coating is being applied to a ferromagnetic metal substrate moving with respect to means for applying the coating, comprising the steps of:

measuring at an input measurement time $t_i$ a value $d_{ind,i}$ by inductive effect and a value $d_{surf,i}$ before the coating is applied without contacting the substrate and using input measurement means placed upstream of the means for applying the coating, pointed at an incoming measurement zone $Z_{B,i}$ of the substrate to be coated, and defining a fixed input reference plane $P°_{ref,i}$ approximately parallel to the substrate in the zone $Z_{B,i}$, wherein the value $d_{ind,i}$ corresponds, if the substrate were not ferromagnetic, to the distance between said reference plane $P°_{ref,i}$ and a surface $S_{met,i}$ of the substrate facing the reference plane $P°_{ref,i}$ in the zone $Z_{B,i}$, and wherein the value $d_{surf,i}$ corresponds to the distance between the reference plane $P°_{ref,i}$ and the surface $S_{met,i}$ of the substrate facing the reference plane $P°_{ref,i}$ in the zone $Z_{B,i}$;

applying the coating in the zone $Z_{B,i}$;

measuring at a time $t_o$ delayed from the time $t_i$ by a delay time $T_d$ a value $d_{ind,o}$ by inductive effect and a value $d_{surf,o}$ in the zone $Z_{B,o}$ after the coating has been applied without contacting the substrate and using second output measurement means placed downstream of a point of application of the coating, pointed at an outgoing measurement zone $Z_{B,o}$ of the coated substrate, and defining a fixed output reference plane $P°_{ref,o}$ approximately parallel to the substrate in the zone $Z_{B,o}$, wherein a transit time for the moving substrate between the input measurement means and the output measurement means is equal to $T_t$, wherein the value $d_{ind,o}$ corresponds, if the substrate were not ferromagnetic, to the distance between a reference plane $P°_{ref,o}$ and a coated surface $S_{met,o}$ of the substrate facing the reference plane $P°_{ref,i}$ in the zone $Z_{B,o}$, and wherein the value $d_{surf,o}$ corresponds to the distance between the reference plane $P°_{ref,o}$ and the coated surface $S_{met,o}$ of the substrate facing the reference plane $P°_{ref,o}$ in the zone $Z_{B,o}$;

choosing $T_d$ to be equal to $T_t$ so that the zones $Z_{B,i}$ and $Z_{B,o}$ correspond to the same substrate zone $Z_B$ before and after coating; and determining the thickness $E_B$ of the coating deposited on the zone $Z_B$ to within a possible corrective factor, from the formula:

$$E_B=(\{d_{ind,o}-d_{surf,o}\}-\{d_{indi}-d_{surf,i})\}).$$

5. A method for continuously measuring, without any contact, the thickness of an insulating coating while the coating is being applied to a ferromagnetic metal substrate moving with respect to means for applying the coating, comprising:

measuring at an input measurement mid-time $t_i$, a series of N values $d_{ind,i}$ by inductive effect and a series of N values $d_{surf,i}$ before the coating is applied without contacting the substrate and using input measurement means placed upstream of the means for applying the coating, pointed at a series of N successive incoming measurement zones $Z_{B,i}$ of the substrate to be coated, and defining a fixed input reference plane $P°_{ref,i}$ approximately parallel to the substrate in the zones $Z_{B,i}$, wherein the N values $d_{ind,i}$ correspond, if the substrate were not ferromagnetic, to the distance between the reference plane $P°_{ref,i}$ and a metal surface $S_{met,i}$ of the substrate facing the reference plane $P°_{ref,i}$ in the corresponding zones $Z_{B,i}$, and wherein the N values $d_{surf,i}$ correspond to the distance between the reference plane $P°_{ref,i}$ and the surface $S_{met,i}$ of the substrate facing the reference plane $P°_{ref,i}$ in the corresponding zones $Z_{B,i}$;

applying the coating to the substrate;

measuring at a mid-time $t_o$ delayed from the time $t_i$ by a delay time $T_d$ a series of N values $d_{ind,o}$ by inductive effect and a series of N values $d_{surf,o}$ on the corresponding coated N substrate zones $Z_{B,o}$, after the coating has been applied without contacting the substrate and using output measurement means placed downstream of a point of application of the coating, pointed at a series of N outgoing measurement zones $Z_{B,o}$ of the coated substrate, and defining a fixed output reference plane $P°_{ref,o}$ approximately parallel to the substrate in the zone $Z_{B,o}$, wherein the N values $d_{ind,o}$ correspond, if the substrate were not ferromagnetic, to the distance between the reference plane $P°_{ref,o}$ and a surface $S_{met,o}$ of the substrate facing the reference plane $P°_{ref,o}$ in the corresponding zones $Z_{B,o}$, wherein the N values $d_{surf,i}$ correspond to the distance between the reference plane $P°_{ref,o}$ and the surface $S_{met,o}$ of the substrate facing the reference plane $P°_{ref,o}$ in the corresponding zones $Z_{B,o}$, wherein values $\overline{d}_{ind,i}$, $\overline{d}_{surf,i}$, $\overline{d}_{ind,o}$, and $\overline{d}_{surf,o}$ denote averages of the respective values $d_{ind,i}$, d,surf,i, dind,o, and $d_{surf,o}$ in each series of N measurements, and wherein a transit time for moving the substrate between the input measurement means and the output measurement means is equal to $T_t$, choosing $T_d$ sufficiently close to $T_t$ that the series of N zones $Z_{B,i}$ and the series of N zones $Z_{B,o}$ have in common at least 90% of the successive zones $Z_B$ before and after coating, wherein the successive substrate zones $Z_B$ form a substrate strand segment; and determining an average thickness $E_B$ of the coating deposited on the substrate strand segment to within a possible corrective factor, from the formula:

$$E_B=(\{\overline{d}_{ind,o}-\overline{d}_{surf,o}\}-\{\overline{d}_{ind,i}-\overline{d}_{surf,i}\}).$$

6. A method according to claim 5, wherein, in order to choose $T_d$ sufficiently close to $T_t$, the frequency of measurement in a series of N measurements corresponding to a sampling frequency $\upsilon$ and/or an integration time $\tau$, $\tau$ being related to $\upsilon$ by the equation $\tau=N/\upsilon$, at least one of $\tau$, N, $\upsilon$ and $/T_d-T_t/$ is chosen so as to satisfy the relationship:

$$\tau > 10 \times /T_d-T_t/,$$

$/T_d-T_t/$ denoting the maximum difference between the delay time $T_d$ and the transfer time $T_t$.

7. A method according to claim 6, wherein at least one of $\tau$, N, $\upsilon$ and $T_t$ is chosen so as to satisfy the relationship:

$$\tau < T_t/10.$$

8. A method according to any one of claims 4 and 5, wherein the values $d_{surf,i}$ and $d_{surf,o}$ are measured by capacitive effect and, the coating to be applied has a predetermined relative dielectric constant $\epsilon_{app1}$, and the corrective factor ($\epsilon_{app1}/(\epsilon_{app1}-1)$) is applied to the calculated thickness $E_B$ of the coating.

9. A method according to any one of claims 4 and 5, wherein the values $d_{surf,i}$ and $d_{surf,o}$ are measured by triangulation of light beams.

10. A method for applying an insulating coating to a moving ferromagnetic metal substrate, in which the thickness of coating applied is regulated by adapting the thickness of the coating applied as a function of a predetermined value of the thickness and of a measurement of the thickness applied, wherein the thickness measurement is performed using the method according to any one of claims 4 and 5.

11. A method according to claim 10, wherein, when the coating is applied in the liquid or pasty state and then solidified after application, the measurements made after application are made before solidification.

12. A method according to claim 10, wherein the moving metal substrate is made of ferromagnetic steel.

13. A method according to claim 12, wherein a standard skin depth in the steel of the inductive-effect measurement is less than 100 μm.

14. A method according to claim 12, wherein the steel is coated with a paramagnetic metal layer comprising one of: zinc, aluminum, chromium, and tin.

15. A method according to claim 14, wherein the thickness of the metal layer is less than a standard skin depth in the layer of the inductive-effect measurement.

16. A method according to any one of claim 10, wherein the moving substrate is a traveling strip.

17. A method according to any one of claims 4 and 5, wherein the moving substrate is a rotating roll.

18. An apparatus for applying an insulating coating to a moving metal substrate, comprising means for applying the coating;

means for moving the substrate, and defining a path along which the substrate travels;

a device for continuously measuring the thickness of the coating applied by the means for applying the substrate, said device comprising:

input measurement means and output measurement means for making measurements along the travel path, the input measurement means and the output measurement means each including a first distance measurement sensor and a second distance measurement sensor, the first sensor operating by inductive effect to measure a first distance to a metal surface placed in the measurement zone, the second sensor configured to measure a second distance to a surface placed opposite the sensor in the measurement zone, wherein the input measurement means and the output measurement means face a same strand of the path along which the substrate travels, the input measurement means located on an input side upstream of the means for applying the coating, the output measurement means located on an output side downstream of the means for applying the coating;

means for triggering the output measurement means after a delay $T_d$ with respect to a time at which the input measurement means is triggered and approximately equal to a transit time $T_t$ for the substrate to move between a measurement zone of the input measurement means and a measurement zone of the output measurement means; and means for calculating the difference between at least one distance datum provided by the first distance measurement sensor and at least one distance datum provided by the second distance measurement sensor, both at the input measurement means and at the output measurement means, and for determining the thickness of the coating applied to the substrate to within a possible corrective factor from a difference between the difference calculated at the output measurement means and the difference calculated at the input measurement means.

19. An apparatus according to claim 18, wherein the second distance measurement sensor operates by capacitive effect.

20. An apparatus according to claim 18, wherein the second distance measurement sensor operates by triangulation of optical beams.

21. An apparatus according to claim 18, wherein the means for applying the coating comprises:

means for applying the coating in a liquid state; and wherein the apparatus further comprises:

means for solidifying the coating, the means for solidifying the coating being located in the path downstream of the means for applying the coating, the output measurement means being located between the means for applying the coating and the means for solidifying the coating.

22. An apparatus according to claim 18, further comprising:

means for continuously regulating the thickness of the coating based on the thickness of the coating determined by the means for calculating the difference.

* * * * *